(12) United States Patent
Hughes (10) Patent No.: US 6,244,291 B1
(45) Date of Patent: Jun. 12, 2001

(54) PROCESS SAMPLING SELECTION VALVES (76) Inventor: Richard E. Hughes, 15915 S. San Pedro St., Gardena, CA (US) 90248

( * ) Notice: Subject to any disclaimer, the term of this patent is extended or adjusted under 35 U.S.C. 154(b) by 0 days.

(21) Appl. No.: 09/519,317

(22) Filed: Mar. 6, 2000

Related U.S. Application Data (62) Division of application No. 09/172,113, filed on Oct. 13, 1998, now Pat. No. 6,125,884.
(60) Provisional application No. 60/062,464, filed on Oct. 15, 1997.

(51) Int. Cl.[7] ..................................................... F16K 11/18
(52) U.S. Cl. ..................... 137/312; 137/597; 137/614.19; 137/614.21; 137/637.2
(58) Field of Search ............................ 137/312, 614.19, 137/614.21, 637.2, 597

(56) References Cited

U.S. PATENT DOCUMENTS

| 1,332,000 | * | 2/1920 | Pfau . | |
|---|---|---|---|---|
| 3,957,079 | | 5/1976 | Whiteman . | |
| 4,703,913 | | 11/1987 | Hunkapiller . | |
| 4,856,551 | * | 8/1989 | Brakelmann ......................... | 137/312 |
| 5,305,788 | | 4/1994 | Mayeux . | |
| 5,361,805 | | 11/1994 | Mayeux . | |
| 5,558,129 | | 9/1996 | Mayeux . | |
| 5,645,102 | * | 7/1997 | Brackelmann et al. ............. | 137/238 |
| 5,765,591 | | 6/1998 | Wasson et al. . | |
| 6,014,983 | * | 1/2000 | Sondergaard et al. ............... | 137/312 |

* cited by examiner

Primary Examiner—Stephen M. Hepperle
(74) Attorney, Agent, or Firm—John E. Wagner; Sam Bernardo (57) ABSTRACT

A process control valve is disclosed including a valve body assembly which includes process fluid input and output ports, an actuation pressure port and a vent port. The valve body includes a cylinder with two pistons longitudinally spaced and separated by a biasing means such as a spring. The pistons each have a rod which acts as a seal for a process fluid port when normally biased by the biasing spring. The actuation port of the body assembly communicates with the opposite faces of the pistons from the bias spring to open the process fluid input and output ports by overcoming the biasing port closing force. The two pistons include rods having process fluid passageways therethrough. The pistons also include a valve poppet & seat combination which is closed whenever actuation force is applied to the process control valve sealing the process fluid path from the vent port. A reversible input/output valve is disclosed as well as a modular assembly of interchangeable valves is disclosed.

17 Claims, 6 Drawing Sheets

PROCESS SAMPLING SELECTION VALVES

REFERENCE TO RELATED APPLICATION

This is a divisional application based upon non-provisional application Ser. No. 09/172,113 filed Oct. 13, 1998, now U.S. Pat. No. 6,125,884. Applicant requests benefit of the Oct. 13, 1998, filing date of application Ser. No. 09/172,113.

This is a non provisional application based upon provisional application Ser. No. 60/062,464 filed Oct. 15, 1997.

BACKGROUND OF THE INVENTION

In the field of chemical process sampling, there has been a divisional application based upon a long felt need for improved sampling valves. Either single or multiplex valves are needed to sample an ongoing chemical process by receiving gas or liquid and upon control actuation, extract a sample of a process stream to be introduced into a chemical process analyzer such as a gas or liquid chromatograph and after the sample is taken, the valve is closed to the process stream.

In multiplex applications a number of valves are each coupled to a different stream at their input and to a single process analyzer at their output. The valves are actuated at different times to provide sampling of each of the streams without intermixing or cross contamination of samples. At the close of the sampling cycle, any residual of the sample stream is discharged from the actuated valve via a common vent output.

Since the valves must be usable in a variety of industries, sampling of a variety of process streams is expected. It is therefore essential that the valves be chemically resistant and diffusion resistant to the sample streams, which they might encounter. More specifically, they must be chemically resistant to material such as strong oxidizers, reducing agents, petrochemicals, especially aromatics and any combinations of such compounds.

Since the valves may be sampling streams from a process which is conducted at elevated or refrigerated temperatures, the valves must operate reliably in a range of the least 0 degrees F. to 300 degrees F.

The valves need to have a high degree of external leak integrity to prevent fire or toxic hazard as well as to minimize what is termed, fugitive emissions.

From the structural standpoint, the valves need to be small in size, simple in design and preferably available for assembly into a variety of modular forms for multiplexing a number of valves together at the input of the single process monitor.

The selection of materials for the valve's structure, as well as its essential seals, must all meet the standard of chemical and diffusion resistance as well as freedom from abrasion or wear which could cause contamination of samples, wear, leaks and shortened operational life. For a truly acceptable valve, some minimum one million cycles of trouble-free operation is needed.

Internally, it is desired that the flow path from the input stream through the valve be as straight or clear is possible, of minimum volume, and without dead end passages which can retain sampled fluid after the sample procedure is completed.

Heretofore, single valves and multiplex valves have been developed but they have failed to meet all of the standards set forth above. Complexity of design, the requirement of numerous seals and presence of confined passage ways have been common. The need for many seals, the failure or abrasion of any one of which may cause leak or contamination of the sample has definitely been the major cause of shortened life of the valves.

BRIEF DESCRIPTION OF THE INVENTION

Faced with the foregoing state-of-the-art, I have determined that it is possible to develop such compact reliable process stream sampling valves which may be using alone or in multiple valve assemblies and achieve an operational life of at least one million cycles of trouble-free operation and without cross contamination or unwanted discharge of the sample stream.

I have accomplished all the foregoing objectives in a valve which is basically a rectangular valve body which defines a two-part cylinder with two independent operating pistons, each with a piston rod carrying a valve seal. The two pistons are biased away from each other to provide the closure of the two valves or ports namely the input valve or port and the output valve or port. The pistons are biased away from each other by single spring to normally maintain both of the input and output ports closed. When actuated at an actuation port, the actuation pressure is in communication with the opposite sides of both pistons from the common bias force, namely the spring, whereby the actuation pressure simultaneously opens both valves or ports by moving the pistons toward each other and closes the vent port.

The pistons on their adjacent faces include a valve seat and a valve poppet aligned and positioned so that upon actuation of the sampling valve, actuation pressure opens the input and output valves or ports, a vent valve or port which is normally in communication with the vent port is closed and the passages within the two pistons define a process gas flow route through the valve body and their piston rods between the inlet port and the output port. The outlet port is normally coupled to suitable analytic apparatus such as a gas chromatograph.

Only two sliding seals on the piston rods, two poppet seat seals and one poppet of the inlet and outlet valve, and the seal of the vent valve are exposed to process gas or liquids. Any remaining seals are either static or travel in the valve in areas which are not normally exposed to the primary process gases or liquid.

The valves are exceedingly simple in design, few parts are required and unessential parts such as end plates and mounting brackets are eliminated while improving the performance and versatility and ease of selection and installation. The interior volume of the process sampling valve of this invention, exposed to the process fluids sampled, is held to a minimum. The valves may be tailored to different and extreme process environments merely by change of relatively few seals to match the requirements of the process stream to be monitored.

This invention may be characterized as a normally closed, pneumatically operated, double block and bleed valve, designed for stream selection in liquid or gas analytical systems. The double block and bleed type valve provides leak integrity to assure against cross contamination of sample streams in multiple stream configurations. The bleed feature minimizes the chance of the previous sample stream being trapped inside the valve during analytical cycles.

Each compact module is designed to handle one stream. Multiple module configurations are available to handle multiple streams. In a multiple module configuration, the outlet ports are common to eliminate dead volume. Each module(s) is mounted on a base that contains a common outlet and vent port. The inlet and air actuator ports are located on each individual valve module. An individual valve module may be removed without disturbing the sealing integrity of other modules. Modules are simple to disassemble for easy maintenance.

Tapered Kel-F seats are used to seal the inlet, outlet and vent valve ports to eliminate leakage and chemical attack in liquid and gas systems. The flow path through each valve is unrestricted to minimize pressure drops. Internal volume is also minimized to 0.48 cc.

Operating pressure ranges of 300 PSIG (21 bar) and 500 PSIG (35 bar) and operating temperatures up to 300° F. (150° C.) allows for a variety of system designs. The minimum 40 PSIG actuating pressure is ideal for systems where there may be fluctuations in air pressure.

BRIEF DESCRIPTION OF THE DRAWING

This invention may be more clearly understood with the following detailed description and by reference to the drawings in which.

DETAILED DESCRIPTION OF THE INVENTION

Figure 1:
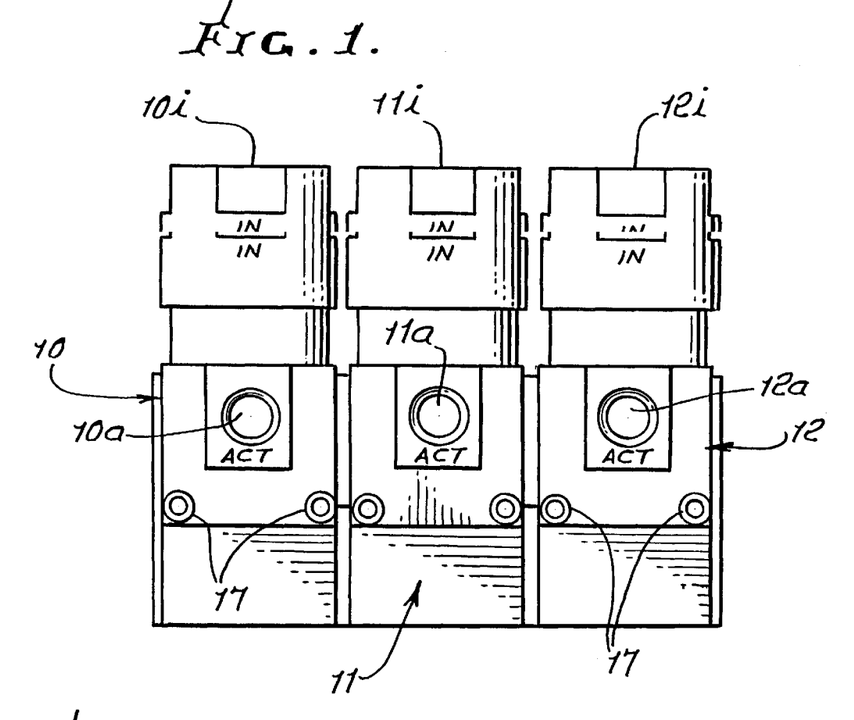
FIG. 1 is a front elevation view of a stack mounted assembly of a number of process stream selector valves each in position for input of a process stream to be sampled from the top and with rear side outlet and venting ports.
Figure 2:
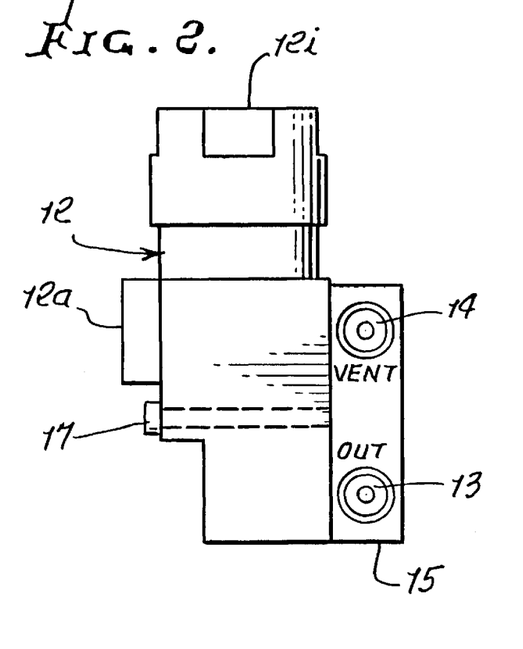
FIG. 2 is a side elevational view of the stack of process stream selector valves of FIG. 1 showing a common base plate on the rear side of the stack of valves with stream outlet and vent outlets for the entire stack located at one end of the base plate.
Figure 7:
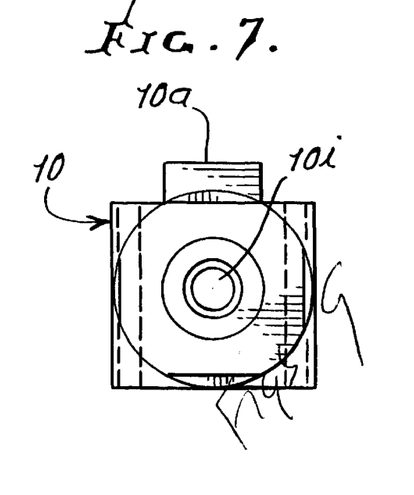
FIG. 7 is a top plan view of a single valve of FIG. 1 showing the inlet port as well as the mounting holes, the latter of which are shown in dashed lines.

Now referring to FIG. 1 in combination with FIGS. 2 and 7, a typical installation of a series of three process stream selector valves 10, 11, and 12 can be seen in which three separate lines of fluid samples may be introduced into inlet ports 10i, 11i and 12i, respectively, by operation of a remote control to introduce valve actuating pressure to any of the valves 10–12 at their respective actuating port 10a, 11a or 12a.

The actuating pressure is typically in the form of presurized air is introduced to operate each of the valves upon command from external controller which is unshown in the drawing but is well known in the process stream sampling art. The process stream from any one of the normally closed inlet ports 10i–12i may be passed through the actuated valve to the respective outlet port 10o–12o of each individual valve as is shown and described below in connection with FIGS. 3 and 5.

The process stream sample from such individual outlet port is transferred to common outlet port 13 of FIG. 2 which is located in a single common base 15 which also is preferably designed to mount all the valves 10–12 and provides not only a common output port 13 but a common vent port 14, as well. The base then acts as an output manifold. The valves 10–12 are all secured to the base 15 by fasteners 17 such as machine bolts and each may be removed separately and replaced by a blank which seals the output port 10o–12o and the vent port 10v–12v opening in the base 15 appearing in FIGS. 3 and 5. A blank plate with suitable 0 ring groove will suffice.

Whenever any of the valves 10–12 are not actuated, all non-actuated or closed valves block the flow of process gas at their respective inlets 10i–12i but their vent ports 10v–12v are all in communication with the common vent port 14 of FIG. 2.

Figure 3:
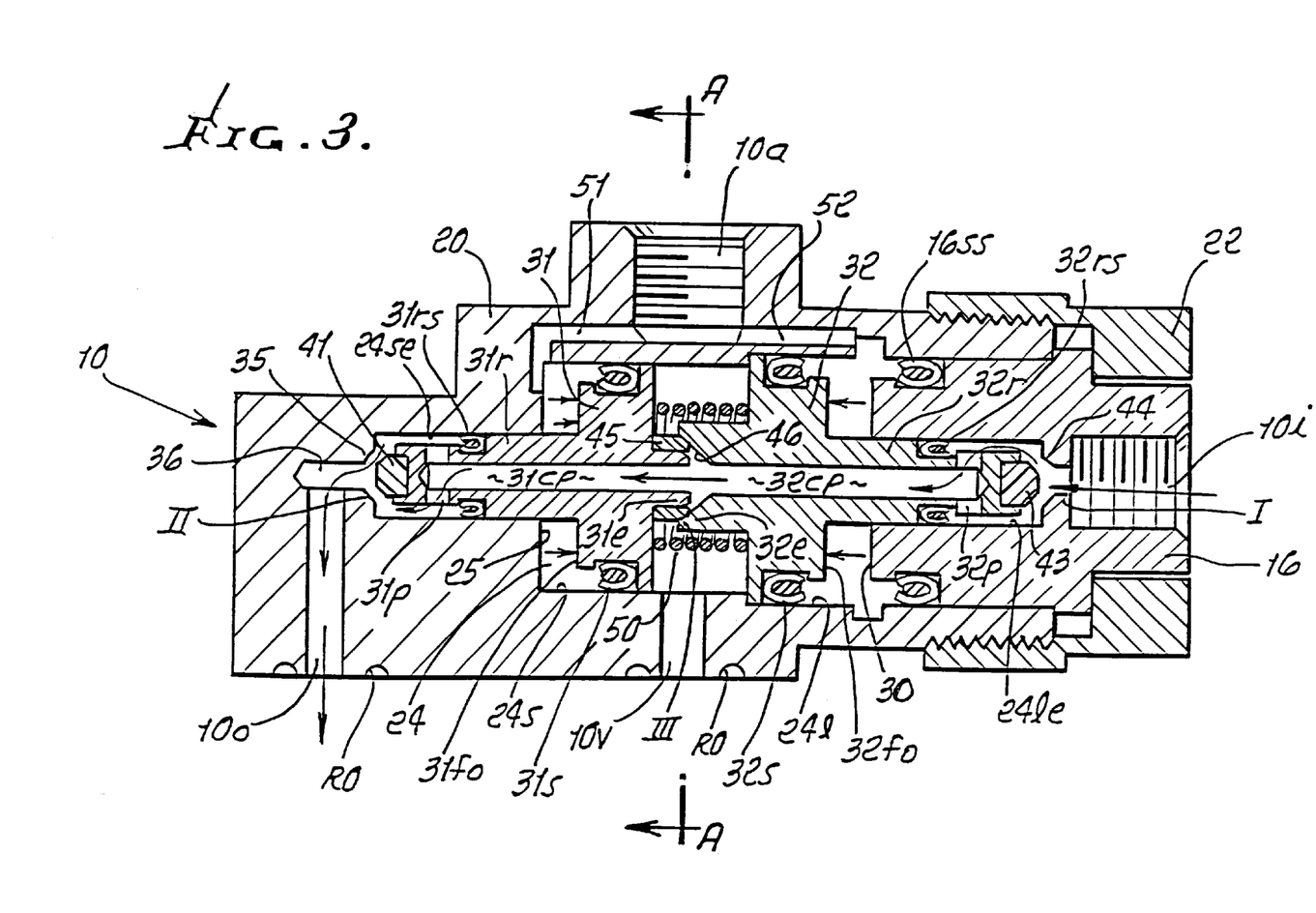
FIG. 3 is a longitudinal sectional view through one of the process stream selector valves of FIG. 1.
Figure 4:
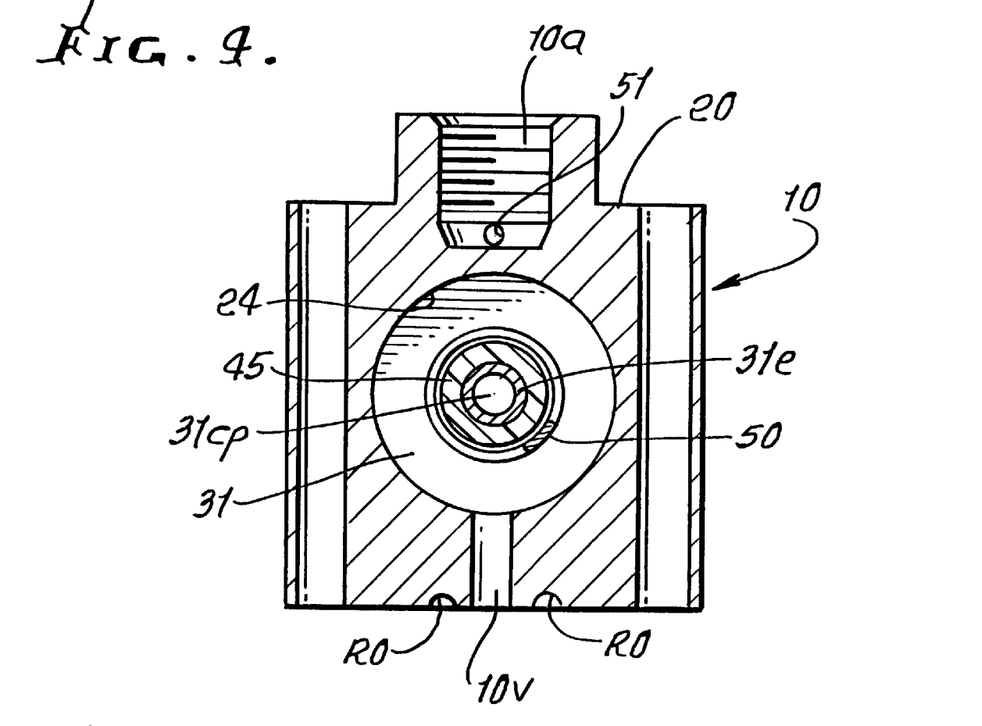
FIG. 4 is a transverse sectional view through a full valve of FIG. 1 taken along the line A—A of FIG. 3.
Figure 5:
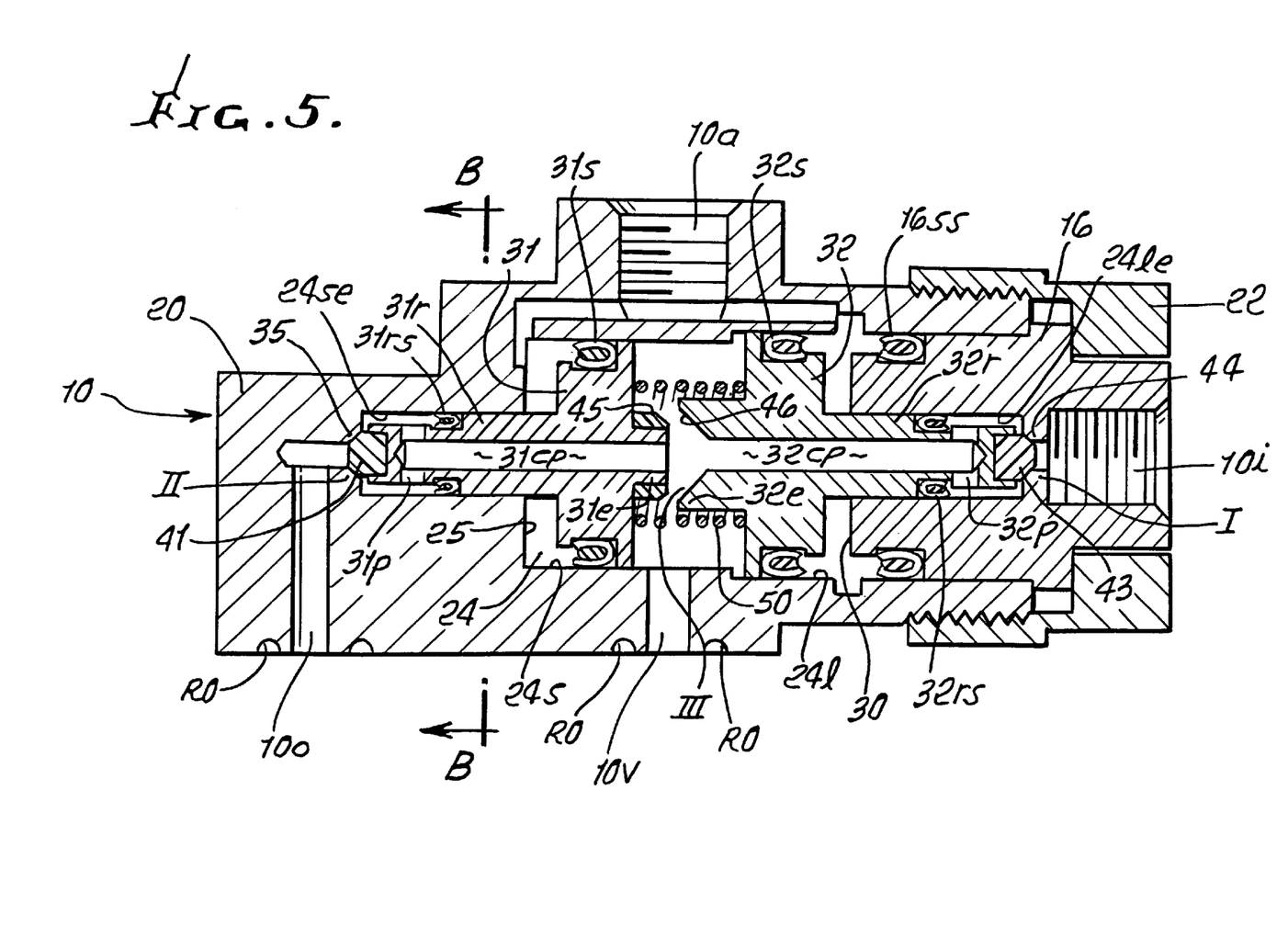
FIG. 5 is a longitudinal sectional view of a valve of FIG. 1 similar to the sectional view of FIG. 3 but in a normally closed position.
Figure 6:
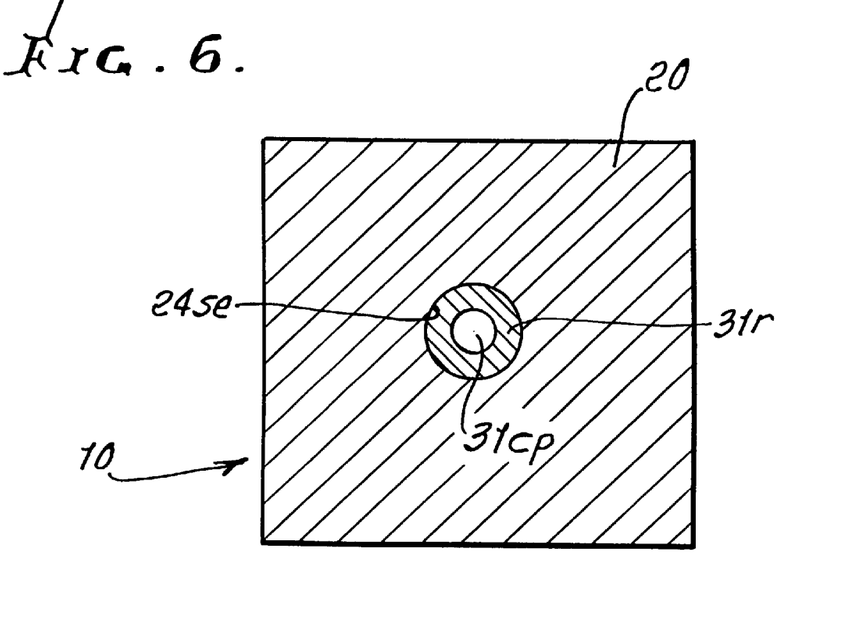
FIG. 6 is a sectional view of a full valve taken along line B—B of FIG. 5.

Now referring specifically to FIGS. 3–5 which are longitudinal sectional drawings of a valve 10 or its identical counterparts 11 and 12 of FIG. 1 to show its internal operating elements. FIG. 3 shows the valve 10 in an actuated or operated condition with flow lines showing the path of a process stream sample from inlet port 10i to the outlet port 10o as is described in more detail below.

Valve 10 may be seen as including a body 20 having its inlet port 10i located in an inlet plug 16 which is secured to the inlet end to the body 20 by a threaded cap 22 and sealed to the body 20 by a composite static seal 16 SS in the preferred form of a U shaped ring of Teflon, Kel-F or other polymer with an internal annular spring or an O ring or other type of seal suitable for the particular application. Spring ring seals of Polymer Concepts Technologies, Inc. have been found satisfactory for such use. Further experience has now concluded that simple 0-ring seals are preferred. The body 20 defines the actuation port 10a, the vent port 10v and the outlet port 10o. The body 20 also defines a stepped diameter cylinder 24 with an end wall 25, a smaller diameter cylinder wall 24s and a larger diameter cylinder wall 24l. The inlet plug 16 defines the opposite end wall 30 from cylinder end wall 25.

Contained within the cylinder 24 are a pair of pistons 31 and 32 with piston 31 of smaller diameter than piston 32 and located in the smaller section 24s of cylinder 24. The larger diameter piston 32 is located within the cylinder 24 in its larger diameter section 24l. The pistons 31 and 32 move in opposite directions responsive to an actuating force, namely toward each other, upon actuation by pressure at the actuation inlet 10a. Upon the release of actuating pressure at inlet 10a, both pistons are returned to their outermost and process stream blocking positions by a central spring 50 which bears upon the inner faces of the two pistons 31 and 32. Piston 31 mounts an appropriate sliding seal 31s within the smaller diameter section 24s while piston 32 mounts its similar sliding seal 32s in sealing engagement with the larger diameter section 24l of the cylinder 24.

The pistons 31 and 32 each include integral piston rods 31r and 32r, respectively, which are in sealed sliding engagement with the walls of axial cylinder 24 extensions 24se and 24le. The pistons 31 and 32 and their respective rods 31r and 32r are hollow and terminate in radial ports 31p and 32p which allow communication between the inner faces of the pistons 31 and 32 and the cylinder extensions 24se and 24le, beyond the seals 31rs and 32rs of the piston rods 31r and 32r.

The piston rod 32r of piston 32 carries its rod tip or seal 43 at its end to engage a valve seat 44 which is located on the inlet plug 16. The rod tip 43 and valve seat 44 serve to form internal valve I and to close the inlet port 10i, whenever the valve 10 is not actuated.

The body 20 defines a conical tapered outlet port valve seat 35 of the outlet valve II which is in fluid communication between the central passage 31cp of piston 31 and the outlet port 10o and an extension passage 36 at the center of the end wall 25. The rod 31r of piston 31 carries the actual rod tip or seal 41 which mates with seat 35 to form the output valve II and to close the outlet port 10o whenever the piston 31 is in its left most position in the drawing FIG. 3, i.e., the valve 10 is not actuated.

The pistons 31 and 32 each also include a respective inner extensions 31e and 32e. The extension 31e carries an annular vent valve seal 45 and the extension 32e defines a vent valve seat 46. Therefore, the valve 10 in actuality contain three internal valves one at the inlet designated I, one at the outlet designated II, and the third valve between the pistons 31 and 32 designated III. The valve III controls the flow of internal residual process gas to the vent 10v.

The pistons 31 and 32 are normally maintained in their extended positions away from each other as shown in FIG. 5 by the spring 50. The vent port 10v is therefore normally opened to the atmosphere or to any gas collection and disposal device beyond the vent port 10v.

Both the pistons 31 and 32 and their rods or extensions 31r and 32r are hollow and each includes a respective central passage 31cp and 32cp as well as ports 31p and 32p in their side wall to allow communication between the inlet and outlet ports whenever the pistons 31 and 32 are actuated and move toward each other by actuation pressure as is explained below.

The actuation port 10a is in communication at all times with the outer faces 31fo and 32fo of both pistons 31 and 32 via passages 51 and 52, respectively. Actuation pressure at port 10a drives the pistons 31 and 32 toward each other against the returning force of spring 50, opening the valve I and the valve II at the inlet and outlets of the valve 10 and closing the vent valve III, this last valve communicating with the vent port 10v. In the actuated condition, flow is open between the inlet port 10i and the outlet port 10o through valves I and II, the pistons 31 and 32 and their piston rods 31r and 32r.

Upon cessation of actuation pressure at port 10a, spring 50 returns pistons 31 and 32 to their normal extended conditions closing the valves I and II while opening valve III to the vent port 10v. It should be noted that the only residual gas present anytime which might be considered trapped within the valve is the small quantity in this central passage of the piston rods 31r and 32r. This gas is purged through the vent as the inlet and outlet ports are closed by the actuation gas as the valve III closes last. Therefore, cross contamination between sequential process samples is effectively eliminated.

When a series of valves 10–12 is assembled as shown in FIG. 1 and each is supplied with its own particular source of process gas and each with its own actuation pressure source, in the absence of any actuation pressure, the inlet ports 10i, 11i and 12i as well as the outlet ports 10o, 11o and 12o of all valves 10–12 are closed and all of the vent ports 10a–12a are open and in full communication with the common vent port 14 of the block or base 15. Therefore, there is virtually no residual gas in any of the valves 10–12 of the stack assembly. When any of the valves 10–12 is actuated, closing its vent valve III, the remaining unactuated valves remain isolated from the actuated valve and each are fully vented via port 10v.

Valves used for process stream selection often are used for sampling highly corrosive gases. In such cases, the few parts which come into contact with the sampled gases, in this invention, namely, the body 20, the input plug 16, spring 50, and pistons 31 and 32 need to be fabricated from materials which are unaffected by the gases to be sampled. This can be accomplished, typically, by fabricating these parts from type 316 stainless steel. Also, the seals required and exposed to such gases must not suffer deterioration and reduced reliability and operating life of the valves. Seals manufactured from such materials as the fluorocarbon resin of the Du Pont de Nemours Co. of Wilmington, Del. sold under the trademark TEFLON or the same company perfluoroelastomer sold under the trademark KALREZ, fluorocarbon elastomer sold under the trademark Viton or the polymer of the Monsanto Company of St. Louis, Mo. sold under the trademark Kel-F, fill nearly all such needs.

In this case, the design of the process sampling valve minimizes the total number of seals required, and in particular, reduces the number of seals which are exposed to the sampled gases or liquids thereby reducing the need for many seals of highest corrosive immunity.

There is one static seal 16ss between the valve body 20 and the inlet plug 16. There are two piston rod sliding seals 31rs and 32rs in communication with the actually sampled fluid.

The rod tip seals 35 and 44 of the valves I and II and the annular vent seal 45 are the only other seals in contact with the sampled fluid. Therefore, this design process sampling valve has a minimum number of seals and only five of them are exposed to the sampled fluid.

There are two larger sliding seals piston seals 31s and 32s which are located on the rear or actuation gas side of the pistons 31 and 32 and not in direct contact with the sampled fluid. These seals 31s and 32s have only contact with the actuating gas. Access to all seals for inspection or replacement may be had after securing the input, output and actuation lines followed by removal of the inlet cap 22 and removal of the inlet plug 16 and the two pistons 31 and 32. All seals are then visible for easy inspection or replacement, if ever necessary.

Each of the planar surfaces which contain a port is typically sealed by an O ring in an annular groove surrounding the port. All in accordance with well established hydraulic practice. The half annular recesses for these O rings are shown in each of the drawings, FIGS. 3–5, 8 and 9 and identified by the references RO.

ALTERNATE EMBODIMENT

Figure 8:
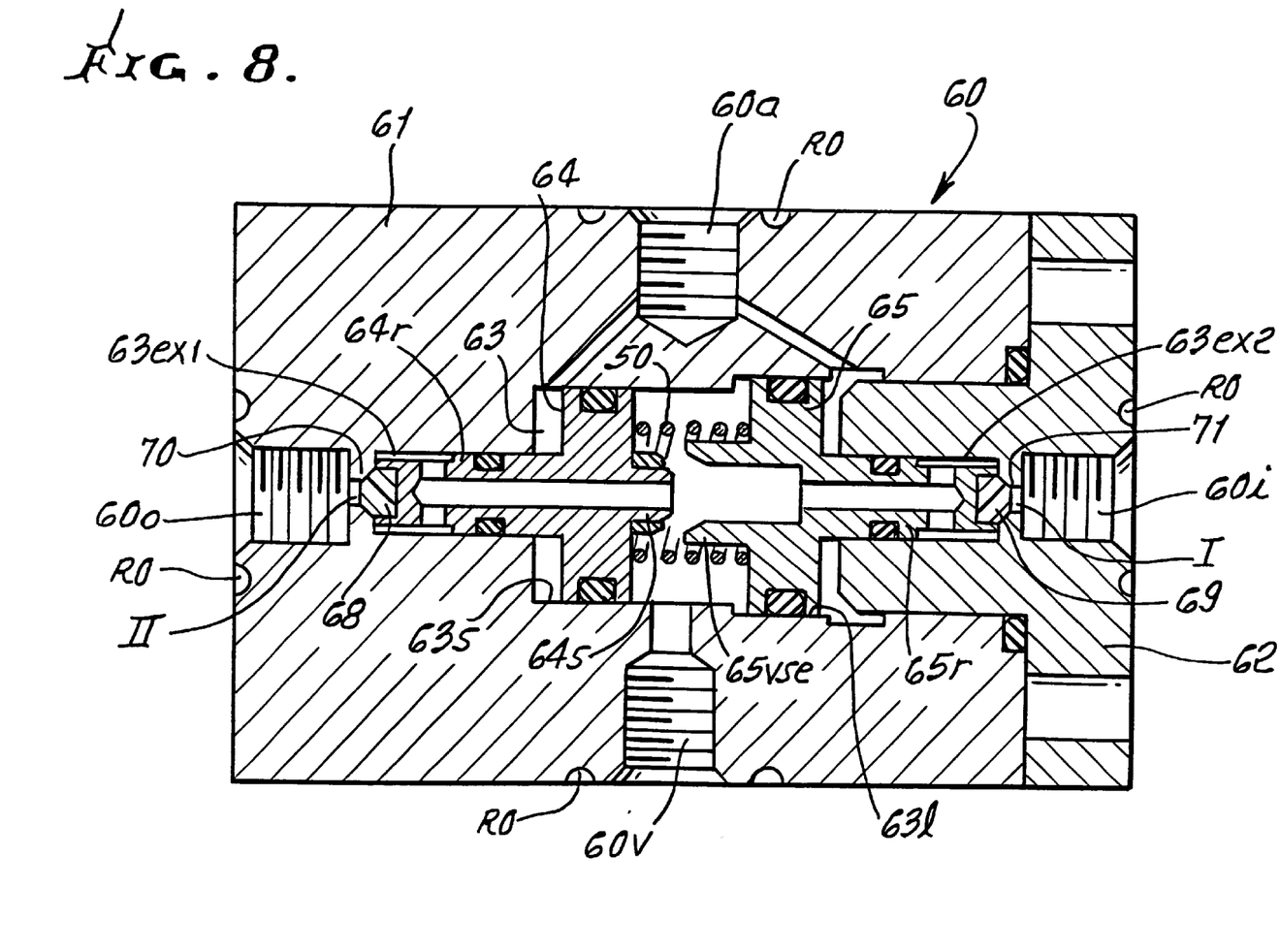
FIG. 8 is a longitudinal sectional view of another embodiment of this invention designed for in-line mounting with operational symmetry in which either end valve may be used as inlet or outlet port and with the process sampling valve assembly shown in the closed or process flow gas isolation or non-sampling condition.
Figure 9:
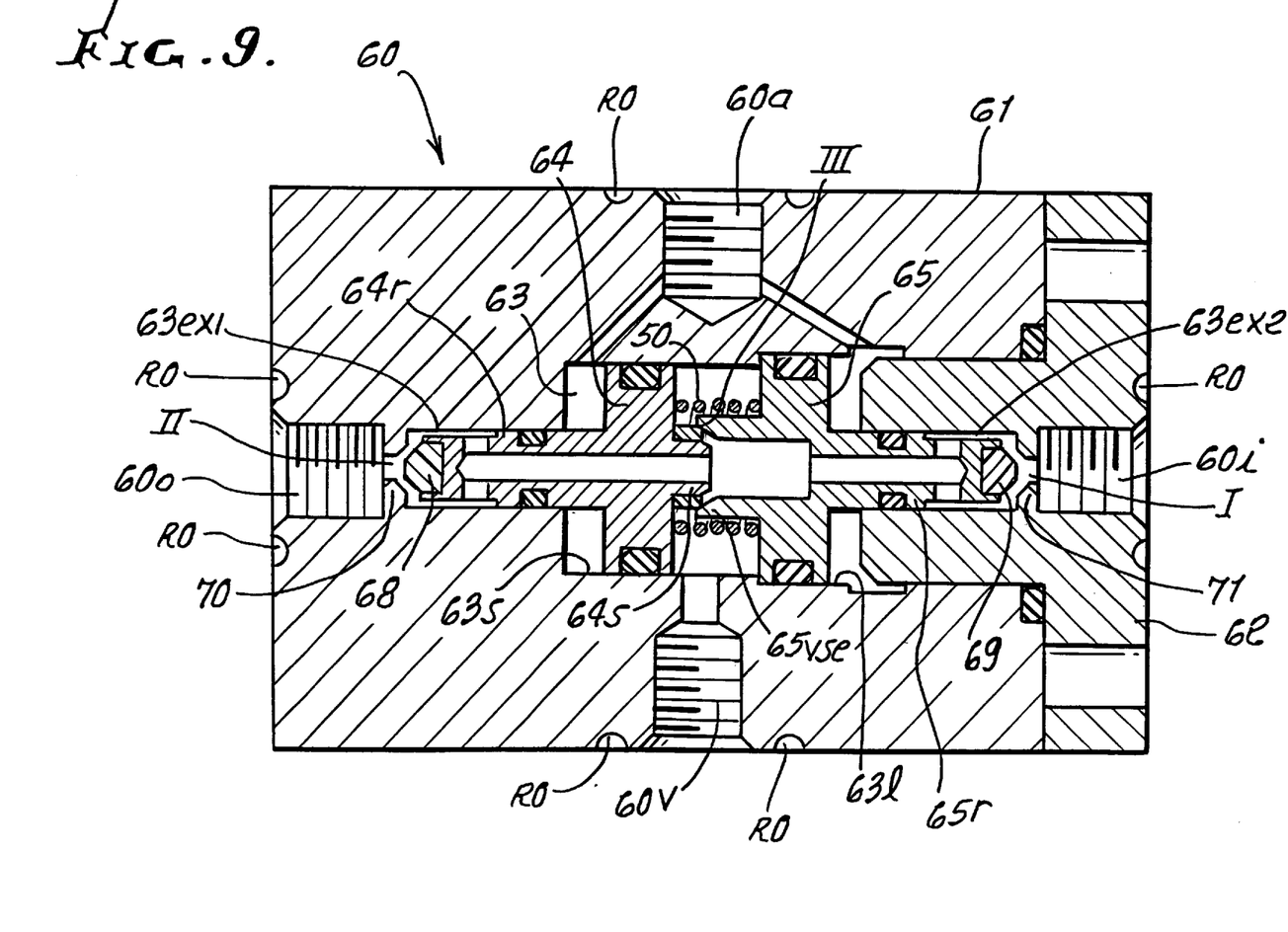
FIG. 9 is a longitudinal sectional view of the embodiment of FIG. 8 shown in a process fluid sampling or actuated condition.

In the case where one or more of the valves of this invention are intended to be mounted individually and not on the backing plate 15 of FIG. 2, or in any case where the valve is desired be mounted with the inlet and outlet ports in line or, for that matter, in any reversible inlet for outlet application, the embodiment of FIGS. 8 and 9 is preferred.

The embodiment of FIGS. 8 and 9 is the free standing or in line version of this invention. This valve, generally designated 60, includes a rectangular body 61 which defines three of the four ports of the valve namely the actuation port 60a, the vent port 60v and one inlet/outlet port 60o. The second inlet/outlet port 60i is located on the end closure 62 secured to the end of the body 61 opposite from the first inlet/outlet port 60o. One clear feature this embodiment is that the inlet/outlet ports 60o and 60i are interchangeable without any modification of the valve, whatsoever.

The body 61, similar to the embodiment of FIGS. 1–7 defines a dual diameter cylinder 63 with a piston 64 located in the small diameter section 63s of the cylinder 63 and a larger diameter piston 65 located in the larger diameter section 63l of cylinder 63. Piston 64 also includes an integral rod section 64r which extends into a cylinder extension 63ex1 and piston 65 includes a piston rod extension 65r which extends into a second cylinder extension 63ex2. The ends of both piston rod extensions 64r and 65r include end seals or rod tips 68 and 69, which mate with valve seats 70 and 71, one of which seat 70 is integral with the body 61 and the other, seat 71, is integral with the end closure 62 to define the internal valves I and II.

The pistons 64 and 65 also include inward extensions, a seal extension 64s and a valve seat extension 65vse which together define the vent valve III, similar to the valve III of the earlier embodiment.

Similar to the previous embodiment, the pistons 64 and 65 are urged outwardly away from each other by a spring 50 normally closing valves I and II while opening the valve III which is formed by extensions 64s and 65vse of the pistons 64 and 65, respectively. The valve III, as in the earlier embodiment, is normally open allowing communication between the interior of the process sampling valve 10 and the vent port 60v.

Of importance to this invention is the fact that the two inlet/outlet ports 64 and 65 are in line so that this valve 60 may be located at any desired location merely by insertion in an existing sample or other line. The actuation pressure line to the actuation port 60a and the discharge line from the vent port 60v are located on opposite sides of the valve for ease of connection.

Another major advantage of this embodiment is a reversibility of inlets and outlets. In both embodiments, the small number of seals which are exposed to the process fluid insures reliability and long life of these valves. The fact that so few seals are required in valves of this invention allows the process engineer with extremely chemically reactive process streams to specify the most effective and expensive seal materials be used without incurring exorbitant costs. Similar to the embodiment of FIGS. 1–7 is the fact in minimum seals are necessary in the design and operation of this valve and only two moving seals and three valve seats are exposed to process gas flow. Also, the seals which are directly exposed to the process sample are the smallest seals in the valve and consequently less expensive.

The above described embodiments of the present invention are merely descriptive of its principles and are not to be considered limiting.

I claim:

1. A process fluid sampling valve comprising:
   a valve body assembly including an actuation port;
   an vent port;
   a process fluid inlet port; and
   a process fluid outlet port;
   a valve cylinder within said valve body in communication with each of said ports;
   a first piston within said cylinder between said inlet port and all of said actuation port, said vent port and said outlet port;
   a second piston within said cylinder between said outlet port and all of said actuation port, said vent port and said inlet port;
   a portion of said first piston selectively closing said inlet port;
   a portion of said second piston selectively closing said outlet port;
   means normally biasing said first and second pistons to close the respective inlet and outlet port;
   said actuation port coupled to a source of actuating pressure;
   said valve body assembly defining actuation pressure passages to said first and second pistons to open said inlet and outlet ports upon the application of valve actuation pressure to said actuation port;
   said pistons each including respective passages therethrough providing fluid communication between said inlet port and said outlet port responsive to actuation pressure produced movement of said pistons; and
   means sealing said vent port from said inlet and outlet ports upon actuation pressure induced movement of said pistons.

2. A process fluid sampling valve in accordance with claim 1 wherein said valve body assembly is elongated with said cylinder extending longitudinally therein, said input port communicates with one end of said cylinder and said output port communicates with the opposite end of said cylinder;
   wherein said pistons are longitudinally spaced in said cylinder, with said biasing means therebetween.

3. A process fluid sampling valve in accordance with claim 1 wherein said biasing means comprises a spring bearing upon adjacent sides of said first and second pistons to bias both pistons away from each other into respective input port and output port closing positions.

4. A process fluid sampling valve in accordance with claim 1 wherein said piston biasing means is located in said cylinder between said pistons for continuously biasing said pistons into respective input and output port closing positions.

5. A process fluid sampling valve in accordance with claim 1 wherein said first and second pistons each have a piston rod on the side of each piston facing a respective input or output port; and
   wherein said piston rods each include seal means for normally closing said respective input or output port.

6. A process fluid sampling valve in accordance with claim 1 wherein said pistons are both longitudinally positioned in said cylinder with said pistons having adjacent faces and remote faces wherein said biasing means applies biasing pressure to said adjacent faces to apply inlet port and outlet port closing force on said pistons; and
   wherein said remote faces mount respective input port and output port closing means.

7. The process fluid sampling valve in accordance with claim 6 wherein said valve body includes a passageway between said actuating pressure port and said vent port through said cylinder ween the adjacent faces of said pistons.

8. The process fluid sampling valve in accordance with claim 7 wherein the adjacent faces of said first and second pistons include mating seal means for blocking the communication between said actuation port and said vent ports and said inlet and outlet ports upon movement of said pistons responsive to actuation pressure on the remote faces of said pistons.

9. A process fluid sampling valve in accordance with claim 7 wherein said valve body includes a passageway between said actuation port and said vent port.

10. A process fluid sampling valve in accordance with claim 9 wherein said passageway between said actuation port and said vent port is located between the adjacent faces of said pistons.

11. A process fluid sampling valve in accordance with claim 1 wherein said first and second pistons are of different diameter and longitudinally spaced in said cylinder in sections thereof of different diameters, and said pistons include adjacent faces and remote faces and wherein said biasing means engage said adjacent faces of said pistons to bias said pistons longitudinally away from each other into respective inlet and outlet port closing positions.

12. A process fluid sampling valve in accordance with claim 11 wherein said pistons include rod extensions on the remote faces thereof, said extensions sealing respective input and output ports of said valve.

13. A process fluid sampling valve in accordance with claim 11 wherein said first and second pistons each define passageways therein between said adjacent and remote faces for the passage of fluid between said input and output ports when said pistons are not in input and output port closing positions.

14. A process fluid sampling valve in accordance with claim 13 wherein said passageways between said adjacent and remote faces of said pistons extend at least partially through said piston rod extensions.

15. A process fluid sampling valve in accordance with claim 11 wherein said rod extensions include process fluid passageways therein for communicating process fluid therethrough.

16. A process fluid sampling valve in accordance with claim 11 wherein said first and second pistons include mating seal means on said adjacent faces;
   said seal means being responsive to actuation pressure induced movement of said pistons to complete the passageway for fluid passage between the input and output ports of said valve.

17. A process fluid sampling valve in accordance with claim 1 wherein said valve body assembly comprises;
   an elongated rectangular body having a plurality of generally planar faces with said actuation port and said vent port on opposite sides thereof and one of said process fluid ports on one end face;
   said cylinder being accessible from said opposite end face
   said opposite end face being closed by an end plug
   said end plug defining the second one of said process fluid ports whereby
   said pistons, biasing means and seals may be removed and replaced from said opposite end.

* * * * *